United States Patent [19]

Cottrell, Jr. et al.

[11] 4,238,176
[45] Dec. 9, 1980

[54] APPARATUS FOR PRODUCING SHEET RESINOUS MATERIALS

[75] Inventors: Walter D. Cottrell, Jr., Newark; Ernest E. Lawson, Columbus, both of Ohio

[73] Assignee: Owens-Corning Fiberglas Corporation, Toledo, Ohio

[21] Appl. No.: 28,411

[22] Filed: Apr. 9, 1979

Related U.S. Application Data

[60] Division of Ser. No. 888,261, Mar. 20, 1978, Pat. No. 4,182,701, which is a continuation of Ser. No. 751,635, Dec. 17, 1976, abandoned.

[51] Int. Cl.³ .............................................. B29D 7/14
[52] U.S. Cl. ........................................ 425/85; 264/87; 264/101; 264/115; 264/257; 264/331; 425/115; 425/371
[58] Field of Search ............... 425/85, 115, 149, 80.1, 425/81.1, 82.1, 371; 264/87, 45.3, 45.8, 115, 174, 257, 331, 101

[56] References Cited

U.S. PATENT DOCUMENTS

| | | | |
|---|---|---|---|
| 2,222,633 | 11/1940 | Sheesley | 425/90 X |
| 2,341,130 | 2/1944 | Unsworth | 264/101 |
| 2,577,214 | 12/1951 | Slayter | 425/80.1 X |
| 2,612,462 | 9/1952 | Zettel | 425/115 X |
| 2,897,874 | 8/1959 | Stalego et al. | 264/115 X |
| 2,997,096 | 8/1961 | Morrison et al. | 425/82.1 X |
| 3,025,202 | 3/1962 | Morgan et al. | 264/115 X |
| 3,077,000 | 2/1963 | Huisman et al. | 264/101 X |
| 3,200,181 | 8/1965 | Rudloff | 264/101 X |
| 3,242,527 | 3/1966 | Rosenberg | 425/371 |
| 3,276,928 | 10/1966 | Pearson et al. | 264/115 X |
| 3,356,780 | 12/1967 | Cole | 425/82.1 X |
| 3,894,134 | 7/1975 | Williams | 264/174 X |
| 4,042,314 | 8/1977 | Bruning et al. | 425/149 X |

*Primary Examiner*—Philip Anderson
*Attorney, Agent, or Firm*—Ronald C. Hudgens; Charles F. Schroeder; William P. Hickey

[57] ABSTRACT

A method of making molding compounds, and particularly sheet molding compounds, wherein the reactive monomers are mixed directly with high density inorganic fillers and other ingredients of a molding compound. The monomers are converted to a resin insitu that is in or approaching the B-stage, so that the material is handleable as a solid and is moldable. Because of the amount, type, and thermal conductivity of the fillers, the resinification can be done quickly in a continuous process, by reason of the fact that the monomers are spread over a large surface area of inert fillers to provide good heat transfer, and exceedingly good process control.

7 Claims, 2 Drawing Figures

APPARATUS FOR PRODUCING SHEET RESINOUS MATERIALS

This application is a division of application Ser. No. 888,261, filed Mar. 20, 1978 and now U.S. Pat. No. 4,182,701, which in turn is a continuation of application Ser. No. 751,635, filed December 17, 1976 and now abandoned.

The present invention relates to a new and improved method of making molding compounds, and particularly sheet molding compounds. The improved method makes it possible to go from the mixing of monomers to the finished molding compound in a matter of minutes as opposed to prior art processes which take hours.

BACKGROUND OF THE INVENTION

Aldehyde condensates, and particularly phenol-formaldehyde condensates were one of the first man-made resins ever to be produced. Phenol-formaldehyde resins have found wide acceptance for making molding compounds because they involve readily available materials and have good di-electric properties. All of the phenol-formaldehyde molding compounds that we are aware of include organic fillers. Wood flour is most commonly used for a number of reasons, including the facts that: the wood flour is inexpensive and has the desirable property of absorbing water that is liberated during the reaction, and there is a known chemical reaction of coupling with the saw dust to provide strength. A considerable amount of heat is liberated during the reaction of phenol and formaldehyde. One of the principal problems that has been involved in the process of making phenol-formaldehyde resins has been the control of the process to keep the temperature from running away and the resin from setting up in the reactor. For this reason and others, the commercial production of phenol-formaldehyde resins has been carried out in a liquid phase in batch reactors having extensive cooling coils and/or jackets, and in addition have been carried out in aqueous solutions, so that the flashing of water from the mixture can be utilized to further control the reaction. Reactions in the aqueous phase comprising approximately 40 to 50% water, require a couple of hours before it reaches the A or B prepolymer stage. The prepolymer is then blended with other materials, as for example, fillers. In the prior art processes wherein the reaction is carried to or approaching a B-stage, the reaction is controlled by utilizing a deficiency of formaldehyde, so that the reaction automatically terminates without crosslinking. Such materials are dried in the reactor, are poured from the reactors in a molten condition and are powdered. This novolak powder is then mixed with a solid hydrogen acceptor, as for example, hexamethylenetetramine to form a powder mixture which will crosslink into a C or an infusible state. Practically all phenol-formaldehyde molding powders that we are aware of are of the novolak type. One of the reasons this is so is that resoles tend to be so sticky and tacky that problems exist in handling and molding mixtures of fillers and conventional resoles.

Resole aldehyde condensate resins have been used heretofore principally as adhesives for making plywood, for binders of highly porous fiber mats, and for making foams from which the water of dilution and of reaction can be easily vented.

In this prior art background, the present invention was made.

An object of the present invention is the provision of a new and improved process of making molding compounds wherein the starting monomers can be transformed into a molding compound within a matter of minutes.

Another object of the present invention is the provision of a new and improved process of polymerizing monomers, and particularly aldehyde condensates, in a continuous controllable process as opposed to a batch process.

A further object of the present invention is the provision of a new and improved process of polymerizing resins having improved controllability, by reason of better heat transfer, and physical control of the reactants, as will be seen from the following description.

A still further object of the present invention is the provision of a new and improved process for making sheet molding compound which is much simpler, more economical, and faster to complete.

DESCRIPTION OF THE PREFERRED EMBODIMENTS

Figure 1:
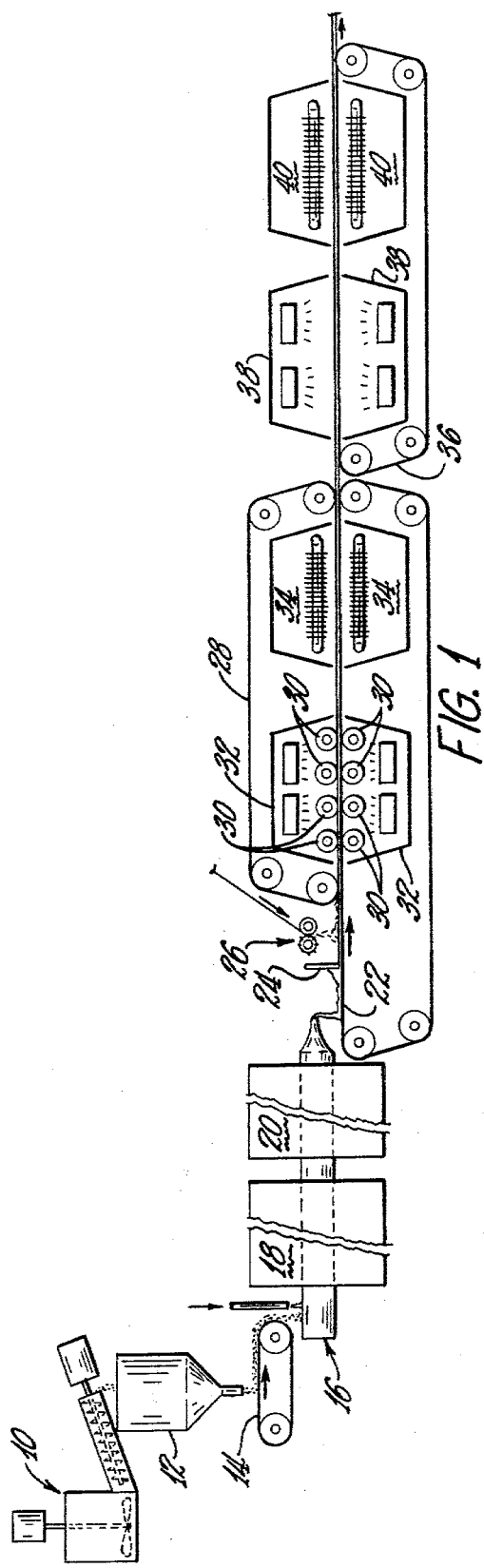
FIG. 1 is a schematic diagram embodying principles of the present invention for making sheet molding compound.

According to principles of the present invention, monomers for producing a polymer are dispersed throughout a relatively high percentage of a solid which the monomer will wet and particularly, inorganic inert materials having a heat transfer coefficient considerably greater than that of the resin. A sizable portion of the inert materials are of a powderous nature and provide a large surface to volume ratio, so that the monomers spread throughout and coat the surface of the inert materials in a relatively thin layer. Thin solutions of phenol-formaldehyde condensates are normally very sticky, but these same condensates when dispersed throughout a volume of inert materials, and particularly inorganic fillers, provide a plastic mix, the surface of which is relatively nontacky. By dispersing at least one of the monomers throughout the inert fillers as a solid, contact between the monomers can be controlled by a kneading action. By kneading the materials during their reaction in a manner which moves the center of the mass to the outside surface, and moves the outside materials to the center of the mass, heat transfer to external surfaces can be made to take place at a relatively rapid rate. A reaction which would normally require several hours in a reaction kettle using the best presently available equipment can be carried out in approximately 10 minutes utilizing the above mentioned principles.

The process lends itself to a continuous operation which can be controlled and terminated by cooling the reaction to stop it at either an A-stage or a B-stage. The method has particular advantages when used to polymerize an aldehyde and a hydrogen donor as for example a phenol, urea, melamine, dicyandiamide, and the other materials with which aldehydes can be reacted and condensed. The present invention, however, can be used for the polymerization of other polymers, for example, polyesters, polyurethanes, polyamides, etc. In some polymer systems, wherein one type of chemical reaction is utilized to produce the linear prepolymer and another type is utilized to produce the crosslinked polymer, it may be desirable to add the crosslinking monomer to the mix after the first stage reaction has proceeded to a desired level.

As previously indicated, the principles of the present invention have particular advantages in the production of sheet molding compounds. The reaction materials after approximately 10 minutes of mixing can be caused to be in the form of a paste that can be fed to a conventional sheet molding compound machine. In this machine a thin layer is applied to a separation sheet, a layer of chopped inorganic fibers is placed on top of the paste and another thin layer of plastic mix is brought down on top of the layer of glass fibers. The resulting sandwich is kneaded together in a well-known manner to produce what is known as sheet molding compound. Because the inorganic fillers are wetted out in the monomer stage, the present invention makes it possible to carry out the initial polymerization to a much higher molecular weight, if desired; the coating of the filler particles by the resin is no longer a problem during mixing; and maturation, therefore, can be held to a relatively short period, or can be done away with entirely. In the case of aldehyde condensates, B-staging can be done during the initial reaction time, or can be completed by a short heating period after the sheet molding compound is made. The present invention makes it possible to carry out the initial polymerization to a solid B-stage wherein the materials can be caused to crumble and subdivide, by reason of the fact that they are dispersed throughout and continually kept in motion with a large volume of inorganic filler. This material can be granular in nature so that a layer of the granular mix can be placed on a moving surface, a layer of fibers put on top thereof, and another layer of the granular materials on top of the fibers in what may now be termed a dry method of making a sheet molding compound. After the layers are put together in a dry condition, they may be heated to fuse the resin. Upon cooling, a rigid sheet is produced which can be fed to a press as a solid sheet, and converted to the C, or infusible state.

The present invention makes it possible to produce a sheet molding compound utilizing aldehyde condensate binder, as for example a phenol formaldehyde binder in approximately 10 minutes. By appropriately chilling mixes of the present invention utilizing A-staged condensates, it is possible to avoid tack problems, and so not use the plastic separation sheets used by the prior art. This is an advantage by allowing a maximum amount of water to be removed from the molding compound prior to the time that it is put in a press.

In general, the fillers may comprise from 50% to approximately 90% by weight of the resin-filler paste solids. An inorganic fiber reinforcement may be used up to approximately 30% of molding compound comprising the fibers, resin and fillers. Any granular and/or powderous inorganic filler can be used. The term phenol will be understood to cover any compound having an OH group affixed to an aromatic ring that has at least 3 lable hydrogens affixed thereto.

EXAMPLE 1

Because the present invention has so many advantages when used in conjunction with aldehyde condensate binders, details of the process will now be explained in conjunction with the production of a phenolformaldehyde binder.

A sheet molding compound was made from the following materials in parts by weight:

| Materials | Parts by Weight |
| --- | --- |
| Calcium carbonate (minus 100 mesh) | 105.0 |
| Phenol (ground to powder) | 38.2 |
| Paraformaldehyde | 18.2 |
| Calcium hydroxide | 3.6 |
| Zinc stearate (mold release agent) | 1.5 |
| Coupling agent (gamma aminopropyltrimethoxysilane) | 0.9 |
| Water | 7.0 |

The sheet molding compound is made using the procedure shown in FIG. 1. The calcium carbonate, powdered phenol, calcium hydroxide, and zinc stearate are added to the blender 10 and thoroughly mixed. Thereafter, the solid blend is conveyed to the storage hopper 12 from which it is fed onto a constant delivery belt 14 whose speed can be adjusted to provide a desired rate of solid materials discharge. The solid material is delivered to a progressing cavity pump, as for example a Moyno pump, that is steam jacketed for approximately one third to one half of its length to supply heat to the mixing material and initiate the reaction of the phenol and the aldehyde. The paraformaldehyde is continuously added to the constant delivery belt 14 immediately before its delivery to the progressive cavity pump and a small spray of water is added to the pump inlet in order to hasten contact between the phenol, paraformaldehyde and calcium hydroxide catalyst, all of which are solvated by the water. Once the reaction is initiated at about 85° C., an exotherm is produced, and the reaction continues for approximately 10 minutes. The rotor of the progressive cavity pump 16 is rotated at a slow controlled rate of speed to provide a slow mixing of the paraformaldehyde, phenol and catalyst throughout the reaction to simultaneously move the materials that are adjacent the rotor outwardly to the heat transfer surface, and vice versa. The last half of the progressive cavity pump 16 is jacketed as at 20 for cooling water. Cooling is used to stop the reaction at a stage where the exiting material has the desired paste viscosity for subsequent flow around chopped glass fibers as occurs in producing sheet molding compounds. This viscosity will generally be below 50,000 centipoise and preferably approximately 20,000 centipoise, depending upon the amount of water that was added with the monomers, and the amount of vaporization which takes place prior to making the sheet molding compound. In some instances, when very little water, if any, is utilized, polymerization of the phenolformaldehyde prepolymer will be stopped at slightly more than an A-stage. When appreciable amounts of water are present, the phenolformaldehyde prepolymer will be stopped at slightly less than a B-stage. In the present instance, the material is slightly more than A-staged, and is spread out on a moving belt 22 by a doctor blade 24 into a layer approximately ⅛-inch thick. Thereafter, chopped glass fiber strand having a length of approximately 1-inch is fed onto the layer of paste by direct fall from a strand chopper 26. Thereafter, the endless belt 22 moves material underneath another continous flexible belt 28, and compaction rollers 30 above and below the two endless belts squeeze the fibers into the paste. Heaters 32 are positioned above the bottom run of the endless belt 28, and below the top run of the endless belt 22 to raise the temperature of the material to again initiate a reaction, which changes the A-staged prepolymer into substantially a partially B-staged material. Thereafter, the endless belt moves the mixture between chillers 34, one of which is positioned above the bottom run of the endless belt 28 and the other one of which is positioned beneath the top run of the endless belt 22. The chillers bring the temperature of the material down, to arrest the reaction, and increase the viscosity of the sheet molding compound to such a degree that the endless belt 28 and the endless belt 22 can be separated from the sheet molding compound without sticking.

Thereafter, the sheet molding compound passes to an open meshed endless belt 36, the top run of which passes between a pair of heaters 38 to which a partial vacuum is communicated to flash off unwanted water and bring the sheet molding compound to a substantially dry handleable state. Not all the water need be removed, however, The sheet molding compound is then moved by the open meshed belt 36 to between a pair of chillers 40 which solidify the now substantially B-staged phenolformaldehyde binder and in turn cause the sheet molding compound to become boardlike and self-supporting.

The sheet molding compound so made needs further maturation. Sheet molding compound containing 15% chopped glass strand when molded at 2,000 psi for 5 minutes between metal dies heated to 350° F. provides a fluxural strength of 15,200 psi, and a flexual modulus of 1,920,000.

EXAMPLE 2

The process of Example 1 is repeated excepting that a 52% formalin solution is substituted for the paraformaldehyde and water. In this case, the formalin is added by spraying into the entrance of the progressive cavity pump. The temperature of the reaction is slightly higher than in Example 1 and the prepolymer is advanced to a slightly higher degree of cure, so that approximately the same viscosity of the paste is maintained even though more water is present. Also in this instance, the heaters 38 are controlled to remove the additional amount of water that is present by reason of the replacement of the paraformaldehyde by the formalin. Parts molded from the sheet molding compound so produced have substantially the same properties as do those of Example 1.

EXAMPLE 3

Figure 2:
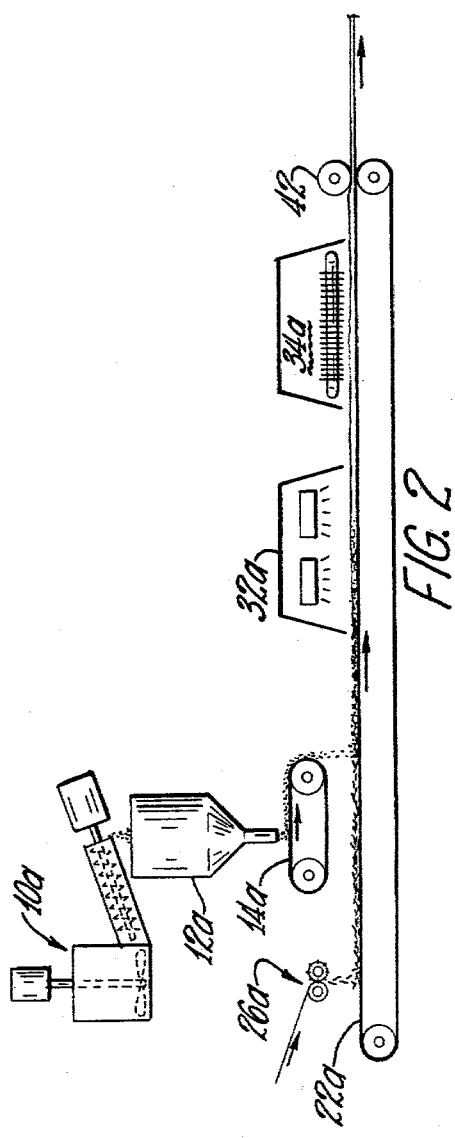
FIG. 2 is a schematic diagram of another embodiment of the invention wherein the fibers are spread into a layer, the monomers and fillers are applied thereto and the monomers then reacted.

The materials given in Example 1 exclusive of the water is made into a sheet molding compound using the procedure of FIG. 2. According to the method shown in FIG. 2, the calcium carbonate, powder phenol, calcium hydroxide, and zinc stearate are added to the dry material mixer and are blended together. The blend of dired materials is conveyed by the constant delivery belt 14a to the endless conveyor 22a. The paraformaldehyde monomer is added continuously to the constant delivery belt 14a just before the materials fall onto the sheet molding compound forming conveyor 22a. In this embodiment, the chopped glass fibers from the chopper 26a are placed onto the endless belt 22a and the dried materials are applied over the top of the layer of chopped fibers which supports the dry materials to some degree. The fibers and powders are then moved by the endless belt 22a into a heater 32a which melts the phenol and brings it into contact with the catalyst and paraformaldehyde to start the condensation reaction. Water is generated a movement of gases through the fibers sweeps water vapor from the materials. The speed of the conveyor and amount of heat added in the heater 32a is controlled so that the reaction continues for approximately 10 minutes, after which time the prepolymer will have advanced to almost a B-stage. Thereafter the belt 22a moves the layers into a cooler 34a which brings the temperature down to stop the reaction and increase the viscosity of the prepolymer to a non-tacky state. The filler and binder are then compressed into the layer of fibers by the compression rolls 42 to produce the sheet molding compound. Parts molded from the sheet molding compound using the procedure as given in Example 1 has substantially the same physical properties as does the material of Example 1.

EXAMPLE 4

A sheet molding compound is made from the following materials utilizing the procedure of Example 1:

| Materials | Parts By Weight |
|---|---|
| Water | 16.68 |
| Portland Cement | 62.83 |
| Phenol | 30.49 |
| Paraformaldehyde | 24 |

The sheet molding compound is made by mixing the portland cement with 7.89 parts of water which is then left standing for 5 days to hydrate. The material is then ground into a fine powder, is charged to the blender 10 along the powdered phenol. This mixture is then charged to the progressive cavity pump along with the paraformaldehyde powder, and 8.79 parts of water is sprayed into the mixture as it is added to the progressive cavity pump. No mold release agent is utilized, the parts of the mold are coated with a mold release agent. The parts so produced when containing 15% by weight of 1-inch long chopped glass fiber strand have substantially the same strength as do the parts produced according to Example 1.

EXAMPLE 5

A sheet molding compound is made from the following materials using the procedure of EXAMPLE 1:

| Materials | Parts By Weight |
|---|---|
| Calcium Carbonate Powder | 100 |
| Ca(OH)$_2$ | 24 |
| Paraformaldehyde | 80 |
| Urea | 100 |

The sheet molding compound is made using the procedure of Example 1 using approximately 30 percent by weight of ½-inch chopped glass fiber strand. This material produces acceptable molded parts having excellent flame resistance with somewhat less strength than does the parts produced by Example 1.

EXAMPLE 6

A sheet molding compound is made from the following materials using the procedure as given in Example 1:

| Materials | Parts By Weight |
|---|---|
| Calcium Carbonate | 100 |
| Ca(OH)$_2$ | 24 |
| Paraformaldehyde | 48 |

| Materials | Parts By Weight |
|---|---|
| Melamine | 100 |

The sheet molding compound made using these materials and molded according to the procedure of Example 1 has low smoke production and good flame resistance, but somewhat less strength than does the molded parts of Example 1.

EXAMPLE 7

A molding compound is made using the procedure of Example 1 from the following materials:

| Materials | Parts By Weight |
|---|---|
| Furfural | 101.8 |
| Phenol | 100 |
| Calcium Carbonate | 600 |
| Ca(OH)$_2$ | 8 |
| Zinc Stearate | 8 |

Molded parts made from this sheet molding compound using the procedure of Example 1 has strength generally comparable to those of Example 6.

EXAMPLE 8

A sheet molding compound is made from the following materials using the procedure of Example 1:

| Materials | Parts By Weight |
|---|---|
| Calcium Carbonate | 600 |
| Phthalic Anhydride | 148 |
| Glycerol | 62 |
| Zinc Stearate | 8 |

The phthalic anhydride, calcium carbonate, and zinc stearate are mixed dry in the blender 10, and the glycerol is added to the progressive cavity pump with a slight amount of water and catalyst to initiate a reaction when heated. The throughput of the pump is controlled so that the material is cooled to stop the reaction before the material reaches a B-stage and while the viscosity is approximately 5,000 centipoise. The temperature in heater 32 is controlled to bring the material to nearly a B-stage and excess water is removed by the heater 38 to produce a flexible sheet molding compound. The materials when molded using 15% by weight of 1-inch chopped glass fibers has properties comparable with conventional sheet molding compound.

It will be seen that the process and apparatus of the present invention has particular advantages for making molding compounds, and particularly sheet molding compounds, from materials, which liberate troublesome water or gases during polymerization. In the most preferred method, monomers are used as the starting reactants and the reaction is carried out in situ with fillers to produce an A-stage or linear prepolymer that is flowable and which makes a tacky paste with the filler. According to further principles of the invention, the paste is then mixed with fibrous reinforcement while the prepolymer is in the liquid A-stage, which for aldehyde condensates is water soluble. Inorganic fibers are wetted by water and evaporation is preferably done in the presence of water and water soluble prepolymers. Unfortunately, these A-staged materials become tacky and sticky in all but dilute solutions.

In the next stage of molding compound preparation, the prepolymer is advanced in cure to a stage wherein the tack is reduced sufficiently that the compound can be removed from plastic surfaces. This requires that the prepolymer approach a B-stage wherein its molecules are essentially linear, but are chain extended to a degree that they are fusible, soluble in organic solvents, have greatly reduced solubility in water, and will separate from plastic surfaces. These properties can be achieved even though the prepolymer is intermediate the A and B stages.

In the last stage of preparation, the prepolymer is advanced to substantially a full B-stage wherein it is essentially crosslinked and non water soluble. This allows as much water as possible to be removed from the finished molding compound. At this stage, the top belt is removed and the bottom conveyor means is preferably porous to permit this water to be removed quickly. The finished molding compound, therefore, has a minimum of water and/or gases which must be removed when the molding compound is actually molded. Molding, of course, is done between heated compression surfaces; and liberation of water and/or gases at this stage can be very troublesome, and may damage the parts produced.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

We claim:

1. Apparatus for preparing sheet molding compound comprising: conveyor means with an impervious upper surface thereon for advancing tacky material past curing stations, and endless belt having an impervious surface and a bottom run spaced above said conveyor means, means for depositing a tacky prepolymer containing material and a fibrous reinforcement therefor on said conveyor means ahead of said endless belt, means biasing said endless belt toward said conveyor means to embed the reinforcement into the prepolymer containing material, first heating means for heating the material between the conveyor means and endless belt to initiate a reaction of the prepolymer, first cooling means for cooling the material between the conveyor means and the endless belt to control advance of the initiated reaction of the prepolymer prior to the end of the bottom run of the endless belt, second heating means for heating the materials on said conveyor means following exiting from said endless belt to again initiate further reaction of the prepolymer containing material to a still crosslinkable, sheet handleable condition, and second cooling means for cooling the material discharged from said heating means to arrest polymerization of said prepolymer containing material in its crosslinkable condition.

2. The apparatus of claim 1 wherein said conveyor means comprises an impervious endless conveyor beneath said endless belt and an open mesh belt for carrying the material through said second heating and cooling means.

3. Apparatus for producing sheet molding compound, comprising: impervious and pervious endless conveyors arranged end to end with said impervious conveyor being arranged to discharge onto said pervious conveyor, an endless belt having an impervious surface with its bottom run spaced above said impervious endless conveyor by a predetermined distance, feed means for depositing a tacky prepolymer containing material in a layer on said impervious endless conveyor ahead of said endless belt, heating means for heating the layer of prepolymer containing material on said impervious conveyor sufficiently to initiate a reaction of the prepolymer, cooling means following said heating means for cooling said layer sufficiently to cause it to separate from said impervious conveyor before discharging onto said pervious conveyor, heating means for advancing the cure of the layer on said pervious conveyor to a nontacky state, and cooling means for cooling the layer on said pervious conveyor sufficiently to form a handleable sheet.

4. The apparatus of claim 3 including means for subjecting the heated portion of said pervious conveyor to a partial vacuum to remove water from the layer of material on said conveyor.

5. The apparatus of claim 3 wherein said feed means comprises: a progressive cavity pump the inlet end of which receives reactants and the discharge end of which discharges to said impervious conveyor, said pump having a heating jacket adjacent the inlet end for initiating reaction of materials therein and a cooling jacket preceding the discharge end for arresting reaction of materials therein before discharge.

6. Apparatus for producing sheet molding compound, comprising: a progressive cavity pump having an inlet end and a discharge end with a heating jacket adjacent its inlet end and a cooling jacket adjacent its discharge end, solid material feed control means for fillers and polymer producing reactants discharging into said pump inlet, an impervious endless conveyor fed by the discharge of said progressive cavity pump, a pervious endless conveyor fed by said impervious endless conveyor, means distributing materials fed from said progressive cavity pump in a layer on said impervious endless conveyor, an endless belt having an impervious surface with its bottom run spaced above said impervious endless conveyor to confine said layer between said impervious surfaces, heating means for initiating a reaction of the reactants in the layer between said impervious surfaces, cooling means following said heating means for cooling said layer sufficiently to cause it to separate from said impervious surfaces, heating means for initiating a further reaction of materials on said pervious conveyor to advance the cure in said layer to a nontacky state, and cooling means for cooling the layer on said pervious conveyor to a handleable state.

7. The apparatus of claim 6 including means for subjecting the layer on said pervious conveyor to a partial vacuum.

* * * * *